(12) United States Patent
Feder et al.

(10) Patent No.: US 6,438,363 B1
(45) Date of Patent: Aug. 20, 2002

(54) WIRELESS MODEM ALIGNMENT IN A MULTI-CELL ENVIRONMENT

(75) Inventors: Peretz Moshes Feder, Englewood; Walter Honcharenko, Monmouth Junction; Haim Shalom Ner, Fair Lawn, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/440,045

(22) Filed: Nov. 15, 1999

(51) Int. Cl.[7] .............................................. H04B 17/00
(52) U.S. Cl. ................ 455/226.4; 455/67.1; 455/226.1; 455/226.2
(58) Field of Search ............................. 455/67.1, 67.4, 455/226.1, 226.4, 226.2, 226.3; 375/220, 222

(56) References Cited

U.S. PATENT DOCUMENTS

| | | | | |
|---|---|---|---|---|
| 5,239,684 A | * | 8/1993 | Ishikura ..................... | 455/67.7 |
| 5,398,276 A | * | 3/1995 | Lemke et al. .................. | 379/21 |
| 5,870,666 A | * | 2/1999 | Tanaka et al. .............. | 455/67.1 |
| 6,035,183 A | * | 3/2000 | Todd et al. ................ | 455/226.2 |
| 6,081,717 A | * | 6/2000 | Shah et al. .................. | 455/446 |
| 6,108,536 A | * | 8/2000 | Yafuso et al. ................ | 455/424 |
| 6,154,638 A | * | 11/2000 | Cheng et al. .............. | 455/67.1 |
| 6,216,001 B1 | * | 4/2001 | Ghirnikar et al. ........... | 455/435 |

* cited by examiner

Primary Examiner—Daniel Hunter
Assistant Examiner—A. Harry
(74) Attorney, Agent, or Firm—Gary D. Yacura

(57) ABSTRACT

In addition to aligning a first unit for proper forward link communications in a wireless environment, there is a method of alignment where a reverse link signal is transmitted from the first unit to a second unit, so that the first unit may be positioned based on at least one signal quality parameter measure contained in a forward link signal reply to the reverse link signal. The method enables an installer to verify signal quality in both the forward link and reverse link directions by reviewing indications of received signal strength for both the reverse link and forward link directions on an LED display, so as to position the first unit for achieving acceptable signal strength in both directions.

32 Claims, 8 Drawing Sheets

WIRELESS MODEM ALIGNMENT IN A MULTI-CELL ENVIRONMENT

FIELD OF THE INVENTION

The present invention relates to wireless communication applications, more particularly to modem alignment in wireless communication systems.

DESCRIPTION OF THE RELATED ART

Explosive growth in the market for internet and intranet related applications has provided the impetus for a greater demand for fixed wireless networking services and systems. A wireless internet access system (WIAS) illustrated in FIG. 1 is composed of four major parts: (a) multiple data base stations (BS) 100(*a*) and 100(*b*) which provide wireless connectivity and radio coverage to subscriber units 102(*a*)–(*d*) (for example, residential and corporate terminal equipment as illustrated in FIG. 1) of a large geographical area; (*b*) wireless modems 170(*a*)–(*c*) (hereinafter "WM") which are connected to BS 100(*a*) or 100(*b*) via wireless links 115(*a*)–(*c*); (c) a data switching center (DSC) 125 with integrated management functions; and (d) a backbone transmission network 135 interconnecting (a)–(c) above.

As can be seen from FIG. 1, corporate terminals 102(*c*) and 102(*d*) can be, and many times are, connected to WM 170(*c*) via a local area network (LAN) and a wireless router or firewall (not shown). Additionally, BS 100(*a*) and 100(*b*) may communicate with DSC 125 via frame relays (not shown). Further in conventional wireless internet access systems or networks, DSC 125 is interconnected with backbone transmission network 135 by a router and/or firewall (not shown for clarity).

FIG. 2 illustrates BS 100(*a*) and 100(*b*) of FIG. 1 in an operational mode. Each BS 100(*a*) and 100(*b*) provides 360° RF coverage on the order of several gigahertz (preferably operating in the 3.5 GHz spectrum using approximately 5 MHz wide channels), sending and receiving signals over air links 115(*a*)–(*c*) between individual subscriber units 102(*a*)–(*d*) served by BS 100(*a*) and/or 102(*b*). More particularly, the designated geographical area of subscribers served by each BS 100(*a*) and 100(*b*) is typically called a cell 150, defined by its coverage area as shown in FIG. 2, where BS 100(*a*) and 100(*b*) are situated in designated cells 150(*a*) and 150(*b*). Within each cell 150(*a*) or 150(*b*) reside a plurality of subscribers 102(*a*)–(*d*) served by the BS 100(*a*) and/or 100(*b*) in the wireless internet access system. Typical cell coverage in urban areas is 2–3 kilometers, extending 4–5 kilometers in suburban or sparsely populated areas. Further, each BS 100(*a*) and (*b*) includes a plurality of access points (hereinafter "AP", not shown in FIG. 1) serving as an interface between individual subscribers 102(*a*)–(*d*) of a cell 150(*a*)–(*b*) served by BS 100(*a*)–(*b*). Each access point includes receiver and transmitter circuitry of the base station for communicating with individual subscribers 102(*a*)–(*d*) within a designated cell 150(*a*)–(*b*).

Due to the need for increasing frequency spectrum reuse in the gigahertz band, in an effort to conserve this precious resource, the trend has been to reduce cell size even further (to microcells or picocells) which cover an even smaller geographical area, or which can serve hard to reach areas such as gullies and depressions where subscribers reside. Unfortunately this beneficial effect of increasing frequency spectrum reuse is offset by an increasing chance of neighboring cells interfering with each other, causing loss or degradation of the wireless signal. This loss or degradation of the wireless signal may be caused by, for example: (a) Rayleigh fading; (b) shadow fading due to obstructions from natural and man-made objects around the main transmission path of the subscriber's devices; and (c) interference between co-channels and/or adjacent channels of wireless networks serving the subscriber's devices.

Thus, in fixed wireless applications it is crucial to operation that the positioning of the wireless modem (WM) within a designated cell is properly aligned, so as to avoid or minimize the interfering effects of neighboring cells, or even possible effects from neighboring WMs within the same cell. To accomplish this, alignment of the WM is normally performed at initial installation.

For ease of installation and proper positioning of the WM within its designated cell or sector, a display device is provided on the side of the WM for diagnostics. This display device includes a plurality of LEDs that provide information to the installer, enabling him to verify that the WM is synchronized and communicating with the access point (AP) at the BS. Although the information provided by the display device is extremely helpful to the installer, it reflects the quality of communication in the forward link (commonly called downlink) direction only, which can be problematic.

For example, in a Rayleigh fading environment, the reflection and multi-path impairments of the reverse link (commonly called uplink) signal may be very different than that of the forward link signal. Although in the forward link direction a WM can establish a communication link with the AP with or without reflections from surfaces, this may be different from the reflection passed in the reverse link direction, WM to AP. If each signal on the opposite direction is bouncing off different surfaces, the delay spread in each direction and the signal strength may vary significantly from reverse link to forward link.

Therefore, there is a need to provide additional information, such as that reflecting the quality of communication in the reverse link direction, for example, on the same display device of the modem currently used for forward link indications. With both indications, an installer may adjust the communicating units to obtain an optimal position which accommodates proper signal quality for both reverse link and forward link directions.

SUMMARY OF THE INVENTION

The present invention provides a method and apparatus for aligning a first unit for wireless communications. A reverse link signal is transmitted from the first unit to a second unit, and the first unit is positioned based on at least one signal quality parameter of the reverse link signal which is contained in a forward link signal reply to the transmitted reverse link signal. More particularly, the method allows an installer to verify signal quality in both the forward link and reverse link directions on a display device of the first unit, repositioning the first unit until a received signal quality parameter for both paths exceeds a threshold value.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not limitative of the present invention and wherein.

DETAILED DESCRIPTION

The present invention provides a method for aligning a first unit in a wireless communications environment based on at least one signal quality parameter received from a second unit, so as to achieve good signal quality for both reverse link and forward link directions. The signal quality parameter measure is contained within the forward link signal reply to a reverse link signal previously transmitted by the first unit. The forward and reverse link signals may be transmitted and received by the same channels in the first and second units, or alternatively transmitted and received at different channels in each respective first and second unit.

The first unit may include a first antenna and associated first radio equipment, and additional circuitry of the first radio equipment including a first radio. The second unit may include a second antenna and associated second radio equipment, and additional circuitry of the second radio equipment including a second radio. Preferably, the first antenna, associated first radio equipment and circuitry is embodied as a wireless modem of a subscriber unit; the second antenna, associated second radio equipment and circuitry embodied as an access point of a base station.

In an embodiment of the invention to be described below, the first unit is hereinafter denoted as a wireless modem (WM), and the second unit is hereinafter denoted as an access point (AP). Further for convenience, the forward link and reverse link signals of the present invention are hereinafter termed "downlink" signals and "uplink" signals, which are terms commonly and often interchangeably used for forward and reverse link signals in wireless technologies. As will be seen below, the method of the present invention provides more precise alignment of the WM as compared to conventional techniques, thereby reducing possible interfering effects from neighboring cells or WMs within an individual cell.

Figure 3A:
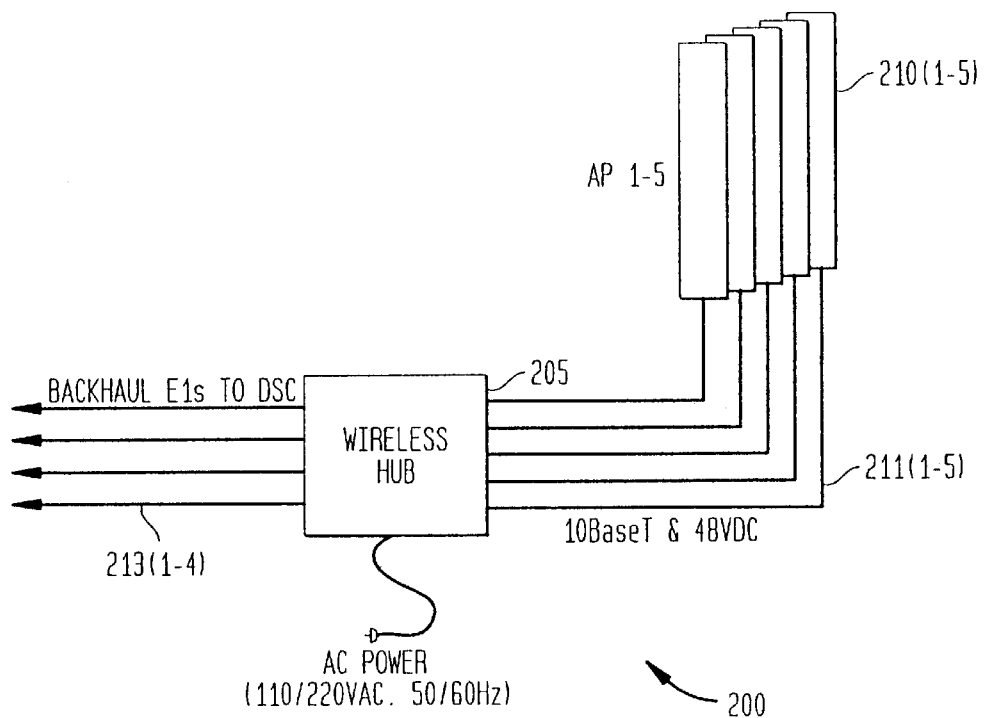
FIG. 3a illustrates a base station in accordance with the preferred embodiment.

FIG. 3a illustrates a base station in accordance with the preferred embodiment. In FIG. 3a, a base station 200 includes a wireless hub 205 and at least one access point (AP) 210, more preferably five (5) APs 210(1–5) as shown in FIG. 3a. Wireless hub 205 is preferably a signal router and power supply that supplies each AP 210 with voltages and data (for example, 48V DC and standard 10Base-T LAN data) through cables 211(1–5), such as 10Base-T cables. All radio and signal processing functions (i.e., transmitting and receiving for BS 200) is contained within AP 210. Further, the wireless hub 205 provides connections 213(1–4) to the data switching center (not shown).

Figure 3B:
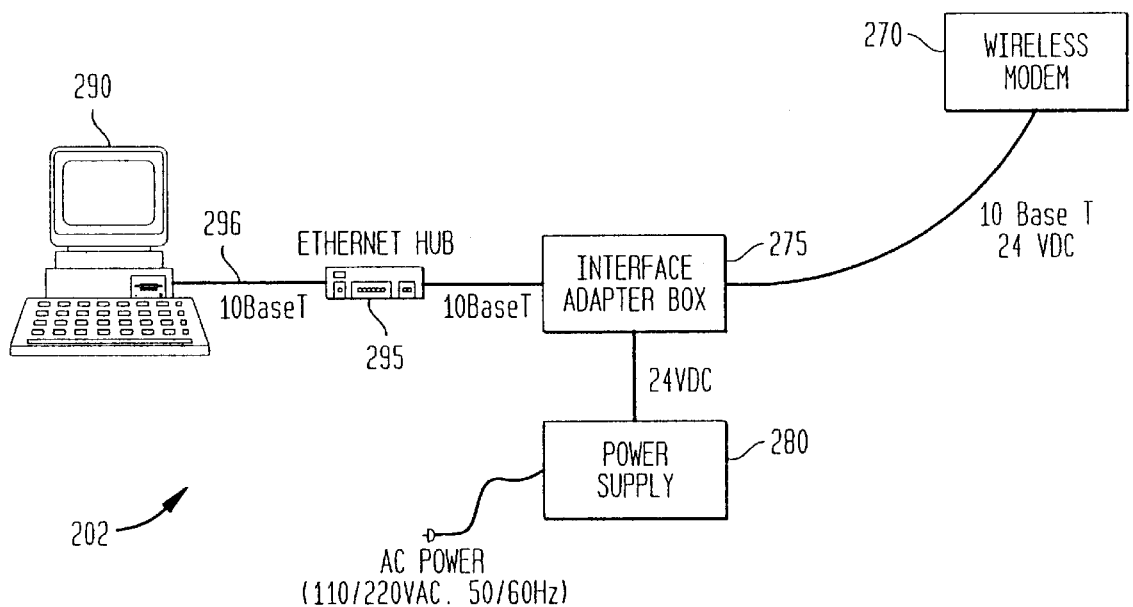
FIG. 3b illustrates terminal equipment for a subscriber in accordance with the preferred embodiment.

FIG. 3b illustrates terminal equipment for a subscriber 202 in accordance with the preferred embodiment. The terminal equipment for a subscriber 202 includes a wireless modem (WM) 270, an interface adapter box 275, and a power supply 280 (for example, a 24 V DC power supply). WM 270 is preferably attached to a subscriber 202's home or office near the rooftop to communicate with the designated AP 210 covering the geographic region of the subscriber 202. A subscriber unit (here PC 290) is preferably connected to interface adapter box 275 via ethernet hub 295 and 296. Once this connection is in place and appropriate wireless internet access software is installed on PC 290, the respective internet or intranets can be accessed.

Both WM 270 and AP 210 have radio units with receiver and transmitter circuitry, each providing for respective transmit and receive functions. An uplink signal transmitted from WM 270 to AP 210 preferably operates in a 1 MHz RF channel between approximately 3450–3500 MHz, whereas a downlink signal transmitted from AP 210 to WM 270 preferably occupies a 1 MHz RF channel between approximately 3550–3600 MHz. Further, both radio units have an automatic gain control (AGC) function to provide linear demodulation over a wide dynamic range; a receive signal strength indication (RSSI) function to enable digital control of the AGC; and both radio units perform quadrature phase shift keying (QPSK) modulation and demodulation, as well as quadrature amplitude modulation (QAM).

Figure 1:
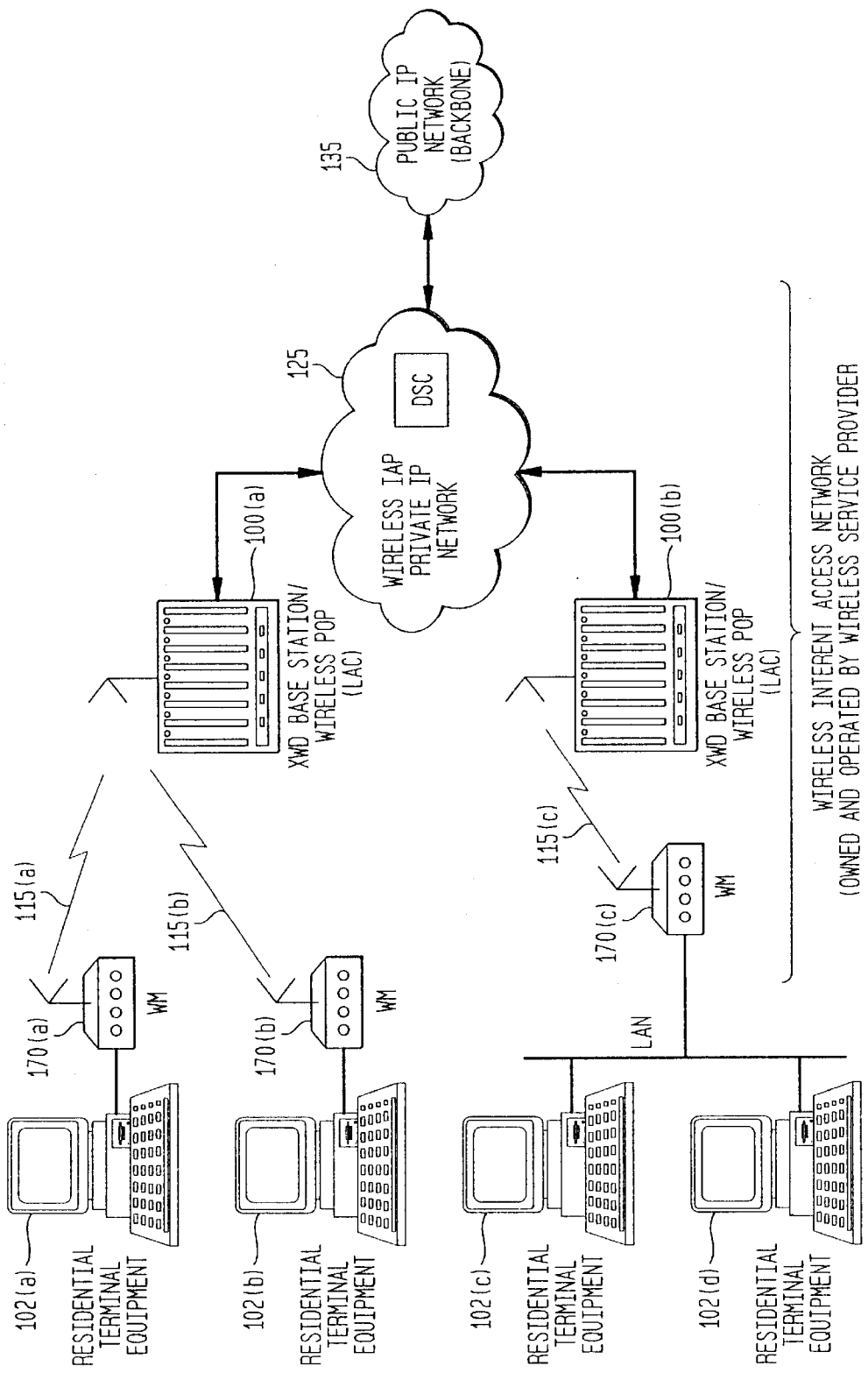
FIG. 1 illustrates a wireless internet access system in accordance with the preferred embodiment.
Figure 2:
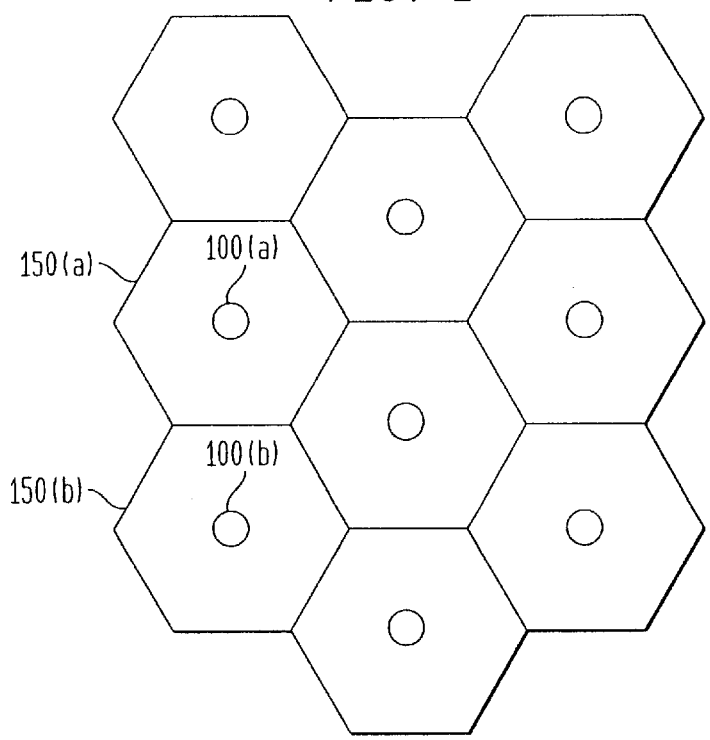
FIG. 2 illustrates the base stations of FIG. 1 in an operational mode.
Figure 4:
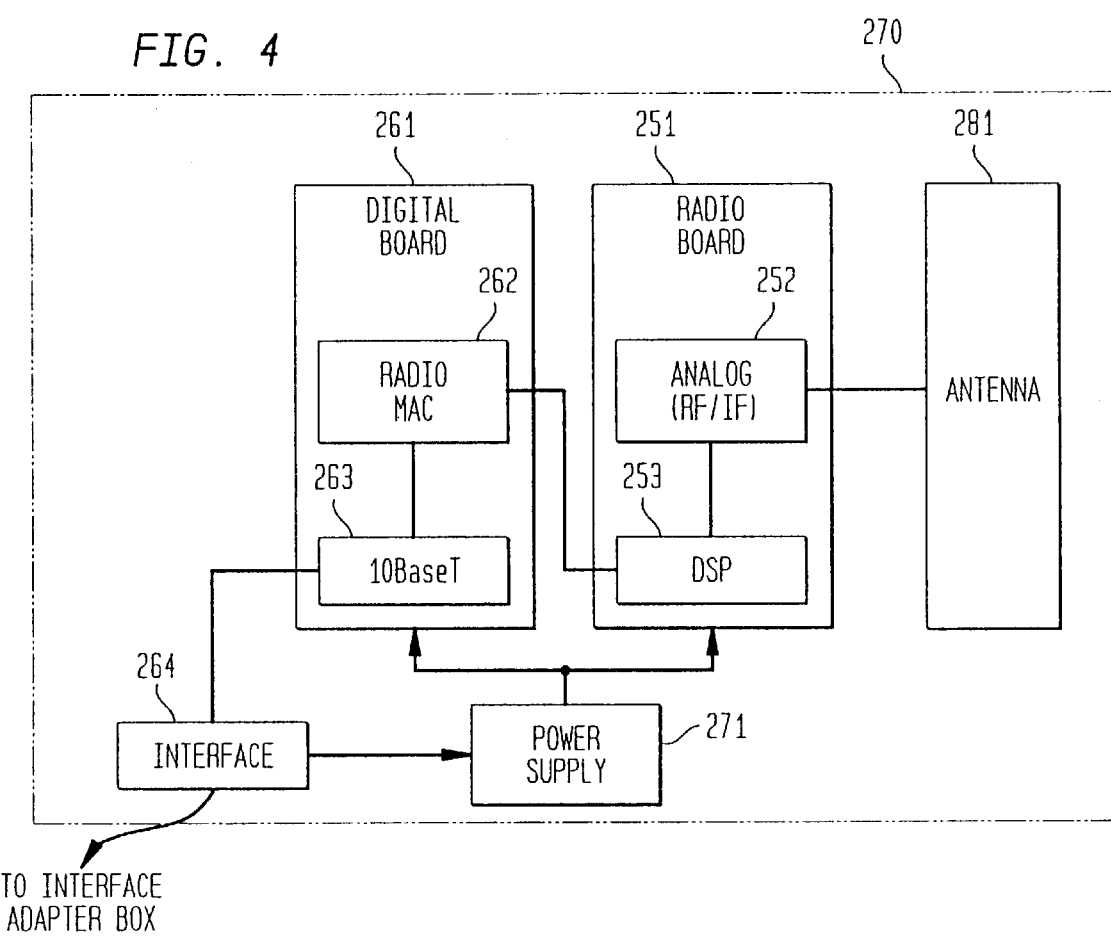
FIG. 4 depicts a wireless modem block diagram in accordance with the preferred embodiment.

FIG. 4 depicts a block diagram of the architecture of WM 270 in accordance with the preferred embodiment. Radio board 251 converts RF signals received from AP 210 via a WM antenna 281 to digital signals, and vice versa. WM antenna 281 preferably is a vertically polarized, 16 element (4×4) raised patch slot fed array designed to operate at a center frequency of 3.5 GHz, which provides for approximately 18 dBi of gain with a 3 dB beamwidth at approximately 18° in the azimuth and elevation planes respectively. The received RF signals are downconverted to baseband I/Q signals through a two-stage heterodyne conversion at 252. DSP 253 performs the QPSK modulation/demodulation of the baseband I/Q signals, which are further processed at a digital board 261.

Digital board 261 provides medium access control (MAC) and protocol functions at 262 to ensure that only a single WM is communicating with an AP at any given time through scheduling of data transmission and traffic management. Digital board 261 also performs conversion of a proprietary MAC data format to standard 10Base-T data streams at 263 for connection to subscriber end user 290 (not shown) via interface 264. Power supply 271 preferably supplies WM 270 with 24 V DC, and preferably supplies 7 VDC to power radio board 251 and digital board 261.

Figure 5:
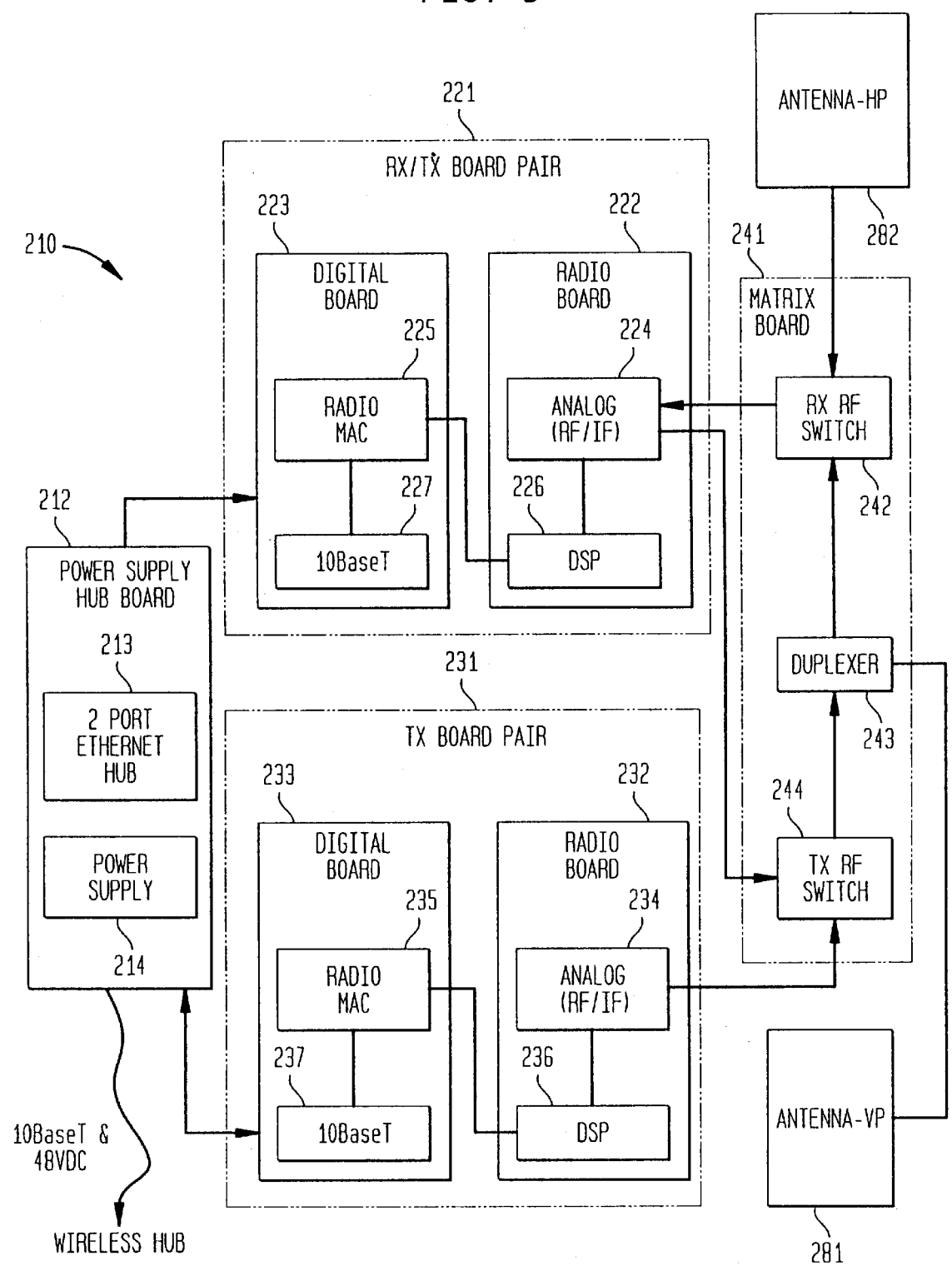
FIG. 5 illustrates an access point block diagram in accordance with the preferred embodiment.

FIG. 5 depicts a block diagram of the architecture of AP 210 in accordance with the preferred embodiment. Similar to WM 270 of FIG. 4, AP 210 includes respective radio and digital boards which perform the same functions discussed above regarding FIG. 4. However, AP 210 has both a receiving/transmitting (RX/TX) board pair 221 and a transmission (TX) board pair 231, each having respective radio boards 222 and 232 which are dedicated to radio functions, and respective digital boards 223 and 233 which are dedicated to the digital processing (at 225 and 235) and interfacing to 10Base-T interfaces 227 and 237. Specifically, the RX/TX board 221 pair is employed for transmission and reception when AP 210 is used in a half duplex mode (AP uses only one board to perform sequential transmit and receive functions), and functions exactly like radio and digital boards 251 and 261 of WM 270. The TX board pair 231 is used strictly for transmission when AP 210 is used in full duplex mode (AP transmitting and receiving simultaneously).

Digital board 233 of TX board pair 231 performs the same functions described in reference to digital board 261 of WM 270. For example, to transmit data, radio board 232 modulates digital signals received from digital board in DSP 236 (preferably QPSK demodulation) and upconverts the I/Q signals (at 234) in radio board 233 to RF signals, which are subsequently transmitted by a vertically polarized antenna 281. AP 210 also includes a matrix board 241 and power supply 212. Matrix board 241 selects the desired board pair for transmission and/or reception and best antenna for reception (281 or 282) via switches 242 and 244. Duplexer 243 isolates receive and transmit frequencies on the vertically polarized antenna 281, while a separate receive filter (not shown) filters the signal received from a horizontally polarized antenna 282.

As discussed briefly above, AP 210 preferably includes two integrated, independent patch array antennas, vertically polarized antenna 281 and horizontally polarized antenna 282. Each array includes eight (8) radiating patch elements arranged in a vertical configuration, providing for approximately 15 dBi of gain at a 3 dB beamwidth of approximately 70° in the horizontal plane and 7° in the vertical plane respectively for each antenna. Signals are always transmitted on vertically polarized antenna 281, whereas reception of signals occurs at both antennas, with RX/TX board pair 221 determining which of the two signals to select based on performance.

Figure 6:
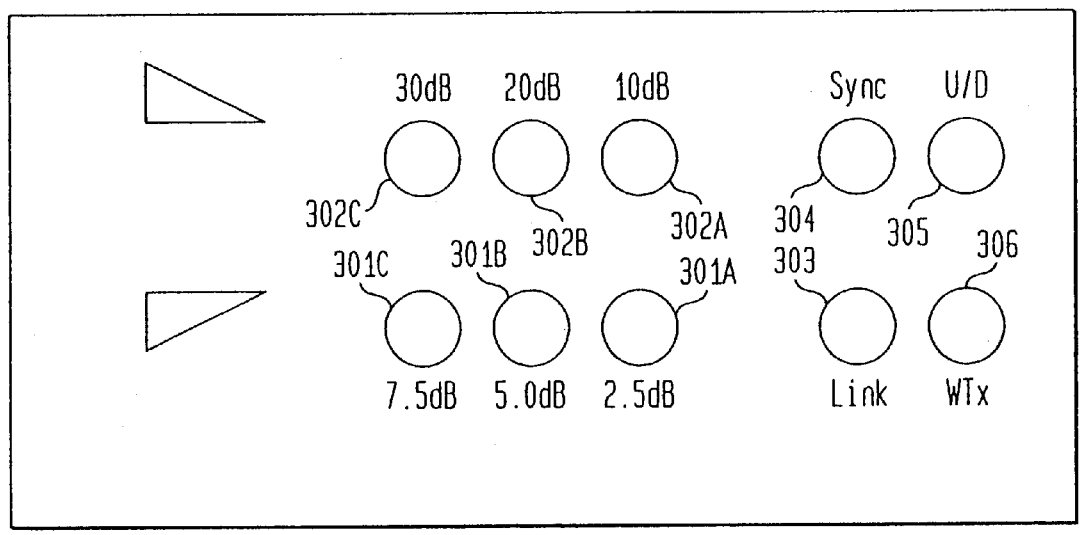
FIG. 6 depicts a display device for the wireless modem of the preferred embodiment.

FIG. 6 illustrates a display device provided on the WM 270 in accordance with the preferred embodiment. As previously discussed, and for ease of installation and proper positioning of a WM within its designated cell, a set of LEDs are provided on the side of the WM for diagnostics. These LEDs provide information to the installer, enabling him to verify that the WM is synchronized and communicating with the AP at the BS. Referring to FIG. 6, there is an LED display 300 including a plurality of LEDs to provide several indications to the installer. When LED display 300 is placed in a fine mode by the installer, LEDs 301A–C preferably provide indications in 2.5 dB steps above a threshold value. When placed in a coarse mode, LEDs 302A–C preferably provide 10, 20 and 30 dB steps above threshold respectively. Link LED 303 illuminates when the ethernet link connection between WM 270 and a subscriber 102(a)–(d) is active. A sync LED 304 illuminates when the WM 270 is in synchronization and communicating with AP 210. A U/D LED 305 is illuminated (i.e., in an ON state) to indicate uplink status (from WM 270 to AP 210), and is de-energized (i.e, in an OFF state) to indicate downlink status (for example, transmitted beacon signals or measurements from AP 210 to WM 270). WTx LED 306 is illuminated when WM 270 is transmitting packets containing information to AP 210.

These LEDs provide information to the installer which enables him to verify that WM 270 is synchronized and communicating with the AP 210 at BS 100(a). The LED information is derived from the downlink signal, AP to WM. For example, as a beacon message (RF signal from AP 210) is transmitted in the downlink direction only once every 20 milliseconds, its detection provides the WM 270 with key information of the AP 210 and the quality of the communication link in the downlink direction.

The operation of aligning the WM 270 in the downlink direction is explained referencing FIG. 4. As described above, the WM 270 has a receiving and transmitting section similar to that of RX/TX board pair 221 of AP 210. In the downlink aligning procedure, the WM antenna 281 initially detects an incoming RF signal from the AP 110 (i.e., beacon messages, or detected incoming packets of downlink information) and filters out the spurious signal. The RF signal is amplified, frequency translated from RF to IF, amplified after a filtration, and frequency translates from IF baseband I/Q signals at 252 and then demodulated into a quadrature pair of baseband signals at DSP 253 to generate digitized signals.

The signals are then subjected to further processing and automatic gain control (AGC) in digital board 261 to set proper gain for each detected incoming packet (the beacon message). Specifically, information regarding a signal quality parameter contained within the normal downlink traffic received from AP 210 is extracted by WM 270. Preferably, the signal quality parameter to be determined is an excess signal-to-noise ratio (SNR) above a threshold. Once extracted, the excess signal-to-noise ratio (SNR) value is determined by gain settings in baseband processing performed by the digital board 261 of WM 270, and then displayed on LED display 300 (either in coarse mode or fine mode). These indications provide information to the installer regarding the received excess signal strength indication (RSSI in dB) above the acceptable threshold.

With this signal strength information, the installer can maximize the received signal by physically repositioning WM 270, thus optimizing the WM 270 and its air link with respect to the incoming AP signal. For example, if the installer inadvertently selects the wrong AP in the wrong cell, and/or the wrong BS, the received AP signal in that geographic area most likely will be lower than expected from a proper cell and/or proper AP. Provided with the incoming (downlink) signal indication on the LED display 300, the proper AP can be determined by the installer checking channels of WM 270 for the strongest signal strength (indicating the correct AP).

Figure 7:
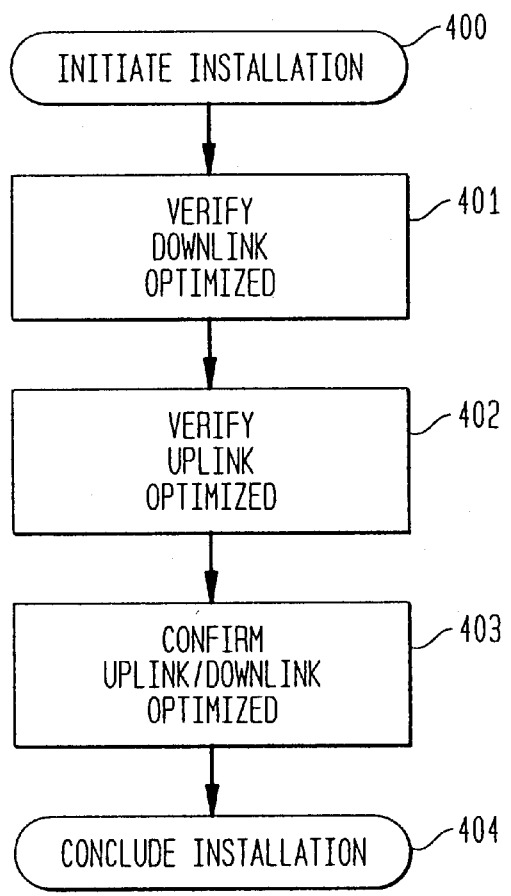
FIG. 7 illustrates a process diagram for performing an installation procedure of a wireless modem in a wireless communications system.

FIG. 7 illustrates a process diagram for performing an installation procedure of a wireless modem in accordance with the preferred embodiment. At the installation site, the installer first initializes or initiates the installation. procedure (step 400) to configure WM 270 for installation. Once WM 270 is configured for installation, the installer then verifies that the modem is properly aligned for downlink communications (i.e., checking downlink path from AP 210 to WM 270) in step 401. Once completed, the installer verifies that the modem is properly aligned for uplink communications (i.e., checking uplink path from WM 270 to AP 210) in step 402. After both uplink and downlink directions have been verified, the installer may perform a confirmation check (this may be mandatory or optional) to confirm that signal quality for both paths are sufficient (step 403), and then concludes the installation procedure (step 404). Each of these process steps will be described in detail below in reference to FIGS. 8–10.

Figure 8:
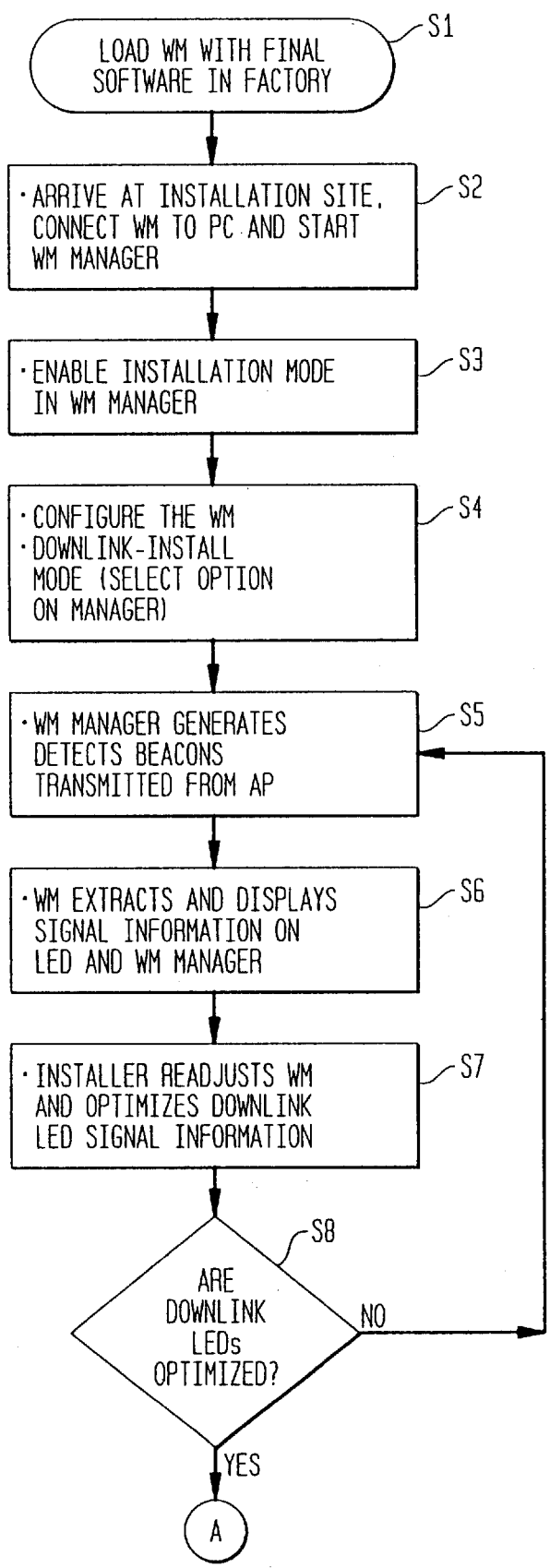
FIG. 8 illustrates the method of initiating the installation procedure and verifying downlink signal strength in accordance with FIG. 7.
Figure 11:
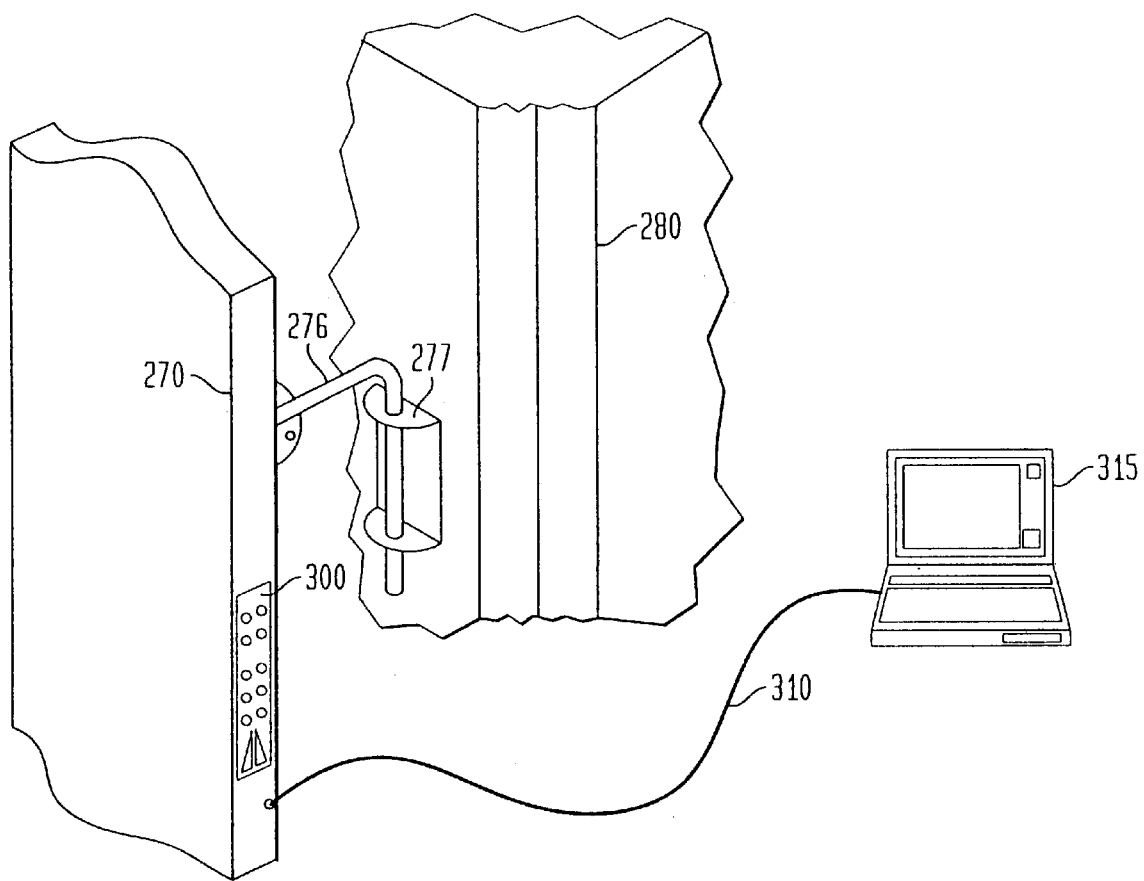
FIG. 11 illustrates a laptop containing the WM manager, which is connected to the wireless modem of the preferred embodiment.

FIG. 8 illustrates the method of initiating the installation procedure and verifying downlink signal strength in accordance with FIG. 7. Specifically, FIG. 8 corresponds to process steps 400 and 401 in FIG. 7. Initially, the WM 270 is loaded with final installation software at the factory before shipment to its point of installation (step S1). This software will be used by the installer at the installation site. At the installation site, (WM 270 at this point has been mounted to the wall or building of a subscriber), an installer arrives and connects WM 270 to a laptop personal computer containing a WM manager (step S2). FIG. 11 illustrates the connection of a laptop 315, which contains a WM manager therein, to the wireless modem 270 by cable 310. The WM manager is a software package that has been pre-loaded on PC 315. The WM manager communicates with WM 270 to generate and display the downlink and uplink information necessary to align WM 270 in both directions.

Once the PC 315 is connected to WM 270, the installer initiates an installation mode for WM 270 in the WM manager by depressing an INSTALL button (not shown in FIG. 11) on the PC 315 (step S3). When the WM 270 is placed in this mode, the installer will be able to initiate modes for both downlink and uplink modem alignment. Before the installation mode can be initiated however, the installer must disable power control of WM 270.

Typically when a WM is powered up, it will attempt to associate and synchronize to the AP beacons by transmitting association requests at its maximum power, until the AP sends an acknowledgement of association and time synchronization. Under normal conditions, when power control is enabled and upon association, the WM 270 will attempt to power down its transmitter and optimize its power while maintaining an acceptable packet error rate (generally 1–3%) to reduce the probability of system level interference. During installation, however, it is desired that the power control algorithm be disabled by loading a configuration file at point of installation. Thus, the WM manager includes a configuration file which will disable power control, which is enabled by the installer at the PC 315.

Once power control has been disabled and the INSTALL button is depressed, the WM 270 is configured for alignment in the downlink and uplink direction. The downlink alignment procedure is described referencing steps S4–S8. The installer selects a DOWNLINK-INSTALL mode in the WM manager to configure WM 270 for checking downlink signal strength (step S4). For example, as a beacon message (RF signal from AP 210) is transmitted in the downlink direction only once every 20 milliseconds, its detection provides the WM 270 with key information of the AP 210 and the quality of the communication link in the downlink direction. These detected beacon messages are processed by the WM manager, and generated as "detect beacon" signals to WM 270 (step S5).

Based on the information contained in these detect beacon signals, the WM 270 extracts and displays signal information on the LED display 300, as described earlier, with respect to FIG. 4 (step S6). From these indications (LEDs 301A–C and/or 302A–C) the installer verifies the quality of the received downlink signal, physically positioning WM 270 so as to achieve an acceptable excess SNR above threshold (step S7). The installer will continue to perform steps S4–S7 until the downlink signal strength indicates a maximum on LED display 300 (i.e., wherein at least one of the LEDs 301A–C or 302A–C are illuminated to indicate an excess SNR above threshold of a few dB, preferably 5 or more dB) (step S8).

Figure 9:
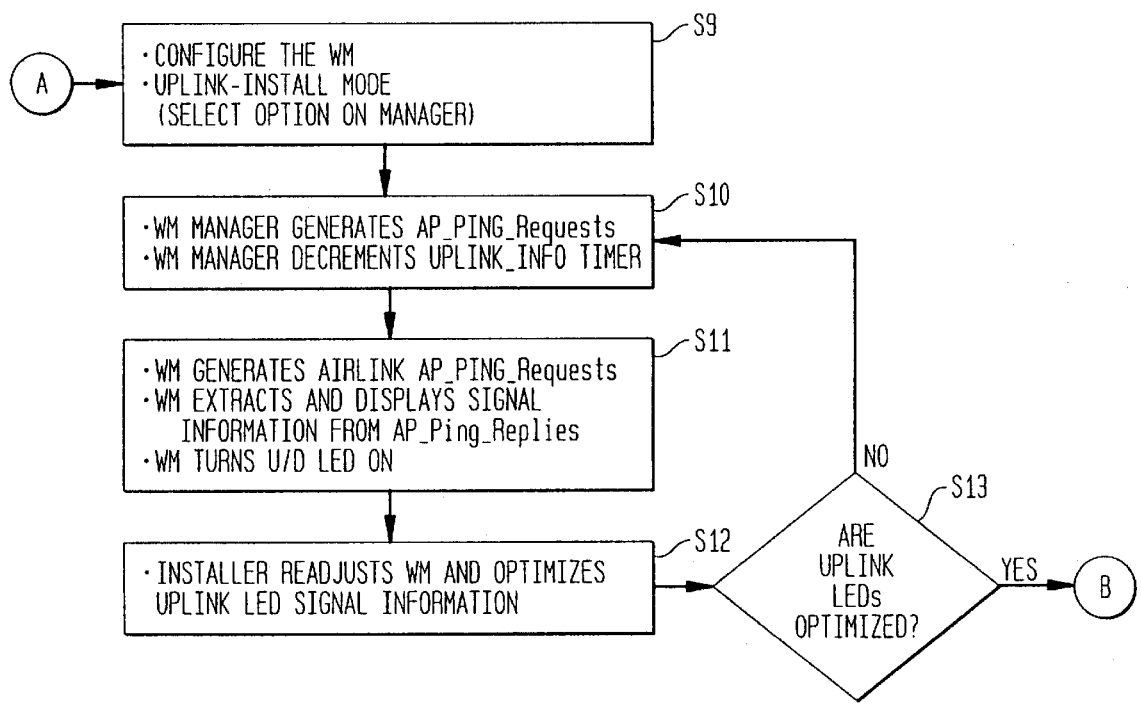
FIG. 9 illustrates the method of verifying uplink signal strength in accordance with FIG. 7.

FIG. 9 illustrates the method of verifying uplink signal strength in accordance with FIG. 7. Specifically, FIG. 9 corresponds to process step 402 of FIG. 7. Once signal quality in the downlink direction has been verified, the installer selects an option in the WM manager to configure WM 270 for alignment in the uplink direction. This is accomplished by selecting an UPLINK-INSTALL mode on the PC 315 (step S9). Until this UPLINK-INSTALL is initiated, LED display 300 will only indicate downlink information (i.e., the U/D LED 305 is de-energized).

After the installer instructs the WM manager to display uplink information (i.e., upon completion of step S9), the WM manager will generate multiple AP ping requests which are sent to AP 210 via WM 270 (step S10). In the UPLINK-INSTALL mode, the PC 315 will provide an option to display, for a limited configurable time period, the uplink signal quality on the LED display 300. This "UPLINK_INFO" is generated in a limited time range of 10 to 120 seconds, so as to minimize air traffic activity between WM 270 and AP 210, and is set once the installation mode is initiated by depressing the install button.

For each AP ping request received for the WM manager, WM 270 transmits a corresponding AP ping request over the airlink to AP 210 (step S11). The RX/TX board pair 221 in AP 210 detects these incoming uplink traffic control packets via antennas 251 or 252 and matrix board 241, adjusting its AGC range to correct its own receiver gain for each detected control packet. This AGC value is directly affected by the SNR of the incoming signal from WM 270.

Moreover in step S11, for each AP ping request received from the WM 270, AP 210 transmits an AP ping reply to WM 270. In the AP ping reply from AP 210, the value of the AP AGC setting is sent back to WM 270, which generated the original uplink traffic control packet. The AP 210's AGC information (specifically its SNR) is embedded within the AP 210 normal downlink traffic.

Software within the WM 270 (the aforementioned installation software loaded at the factory) then extracts AP 210's AGC information, and displays the AP's excess SNR above threshold on the relevant LED 301A–C and/or 302A–C of the WM 270. The U/D LED 305 remains energized at this time to indicate the continued uplink status of WM 170. During this time, the installer reviews the LED indications and adjusts the WM 270 accordingly to achieve a desired signal strength for the uplink direction (step S12). The installer will continue to perform steps S10–S12 until the uplink signal strength indicates a maximum on LED display 300 (i.e., wherein at least one of the LEDs 301A–C or 302A–C are illuminated to indicate an excess SNR above threshold of a few dB, preferably 5 or more dB) (step S13).

Figure 10:
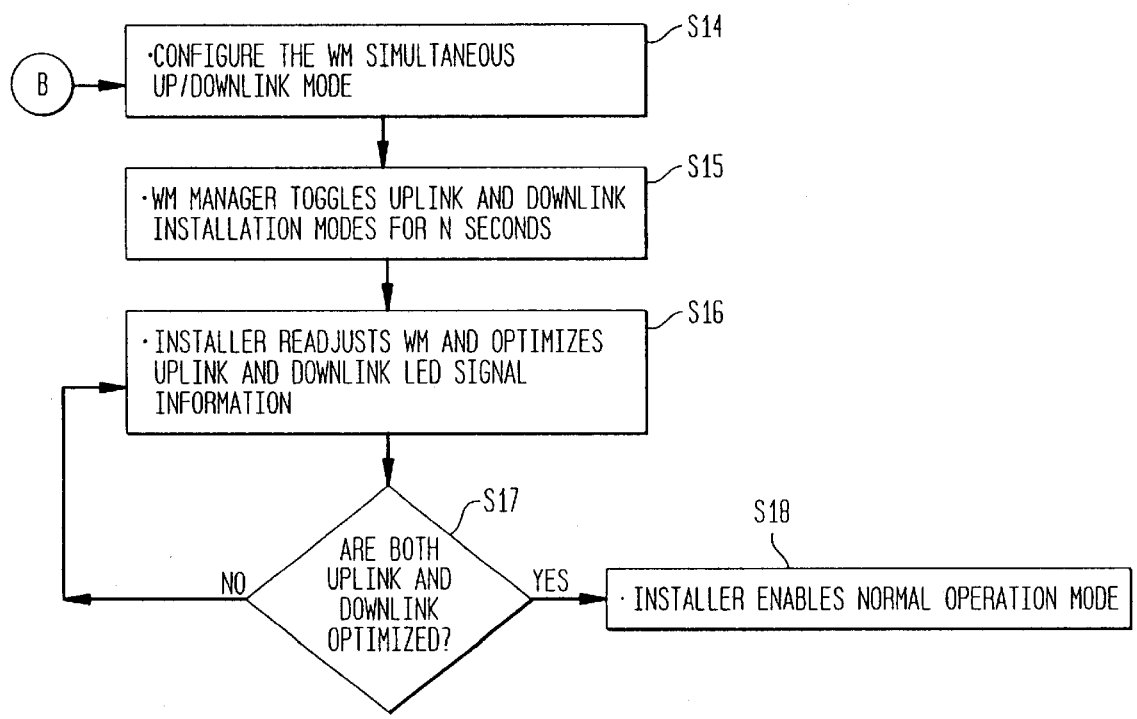
FIG. 10 illustrates the method of confirming downlink and uplink signal strength and concluding the installation procedure in accordance with FIG. 7.

FIG. 10 illustrates the method of confirming downlink and uplink signal strength and concluding the installation procedure in accordance with FIG. 7. Specifically, FIG. 10 corresponds to steps 403 and 404 of FIG. 7. Once the installer has verified signal quality for both downlink and uplink directions, he may perform a confirmation check for both downlink and uplink directions (steps S14–S17). Specifically from the PC 315, the installer first configures WM 270 for a simultaneous uplink/downlink mode (step S14), whereupon the WM manager toggles the DOWNLINK-INSTALL and UPLINK-INSTALL modes for N seconds (step S15), so that the installer can perform slight readjustments of WM 270 in each mode (step S16), if necessary, to verify that excess SNR above threshold, as indicated on LEDs 301A–C and or 302A–C is above an acceptable value for both uplink and downlink direction (step S17). Once achieved, the installer loads a configuration file from the WM manager to re-enable power control in WM 270 for normal operations, concluding installation of WM 270 at the installation point (step S18).

Therefore, the present invention provides a method for aligning a first unit in a wireless communications environment based on reverse link signals, more particularly by measuring at least one signal quality parameter received from a second unit in reply to a transmitted reverse link signal. Additionally, the method enables alignment of the first unit so as to achieve good signal quality for both reverse link and forward link directions.

Moreover, the installation method of the present invention allows a first unit to be installed by using additional reverse link information on the same LED display 300 which is used to verify an acceptable signal quality of the forward link path. This enables the installer to initiate reverse link activity so as to check a signal quality parameter (i.e., excess SNR) above a threshold for both reverse link and forward link paths, positioning the first unit to achieve acceptable signal quality in both directions.

The invention being thus described, it will be obvious that the same may be varied in many ways. For example, although the signal quality parameter measured or determined is preferably an excess SNR value above a threshold, other information such as frame error rate data, packet error rate data and bit error rate data may be used for aligning the wireless modem in both directions. Additionally, although the antennas of FIGS. 4 and 5 are preferably horizontally or vertically polarized, the antennas are not limited to such structure and may be circularly polarized, for example. Moreover, although the above embodiment describes aligning a wireless modem based on a forward link signal reply to a reverse link signal request, alignment of antennas and their associated radio equipment may also be performed by the method of the present invention.

Regarding FIGS. 7–9, the order of performing the UPLINK-INSTALL and DOWNLINK-INSTALL modes are interchangeable, the installer may initially perform alignment of the uplink direction and then align the modem for downlink thereafter. Such variations are not to be regarded as a departure from the spirit and scope of the invention, and all such modifications as would be obvious to one skilled in the art are intended to be included within the scope of the following claims.

What is claimed is:

1. A method of aligning a first unit for wireless communications, comprising:
   displaying at least one signal quality parameter of a forward link signal received from a second unit and at least one signal quality parameter of a reverse link signal transmitted to the second unit that is contained in a forward link signal reply received by the first unit from the second unit;
   aligning the first unit in a forward link direction based on the displayed at least one signal quality parameter of the received forward link signal; and
   aligning the first unit in a reverse link direction based on the displayed at least one signal quality parameter of the reverse link signal.

2. The method of claim 1, wherein said first unit is a wireless modem and said second unit is an access point.

3. The method of claim 1, wherein said first and second units include antennas of radio equipment.

4. The method of claim 2, further including connecting the wireless modem to a managing computer for displaying signal quality information of a forward link signal and for configuring the wireless modem to generate reverse link information to the access point.

5. The method of claim 1, said forward link reply containing reverse link signal strength information, said aligning in the reverse link direction based on the received reverse link signal strength information.

6. The method of claim 1,
   wherein said displayed signal quality parameters include displayed forward link and reverse link signal strength information, and
   wherein said step of displaying further includes displaying each of said forward link and reverse link signal strength information as an excess signal-to-noise ratio, SNR, above a threshold value, the wireless modem being positioned so as to achieve an acceptable excess SNR above threshold for both forward link and reverse link directions.

7. The method of claim 2, further including disabling power control of the wireless modem before aligning the modem in the forward link and reverse link directions.

8. The method of claim 2, further including enabling power control of the wireless modem after aligning the modem in the forward link and reverse link directions.

9. The method of claim 2, wherein said reverse link signal is an uplink signal transmitted from the wireless modem to the access point, and said forward link signal is a downlink signal transmitted from the access point to the wireless modem.

10. An article of manufacture including a computer program embodied on a computer-readable medium for aligning a first unit in a wireless communications environment, the computer program comprising:
    a forward link mode segment for causing the computer to place the first unit in a forward link mode to process forward link traffic activity received from a second unit, said forward link traffic containing information indicative of at least one signal quality parameter of the forward link signal; and
    a reverse link mode segment for causing the computer to place the first unit in an reverse link mode to generate reverse link traffic activity to a second unit, wherein a reply from the second unit containing information indicative of at least one signal quality parameter of the reverse link signal,
    the computer program causing said information of said information indicative of said at least one signal quality parameters of the forward link and reverse link signals to be displayed in order to align the first unit in both a forward link and reverse link direction.

11. The article of manufacture of claim 10, wherein said signal quality parameters of both forward link and reverse link signals are displayed on the first unit.

12. The article of manufacture of claim 10, further including a power control disable segment for causing the computer to load a configuration file for disabling power control of the first unit in preparation for aligning the first unit in the forward and reverse link directions.

13. The article of manufacture of claim 10, further including a power control enable segment for causing the computer to load a configuration file for enabling power control once the forward link and reverse link signal quality parameters exceed an acceptable threshold, thereby indicating that said first unit has been aligned in the forward and reverse link directions.

14. The article of manufacture of claim 10, wherein the forward link and reverse link signal quality parameters are each displayed as an excess signal-to-noise ratio, SNR, above a threshold value, the first unit being positioned so as to achieve an acceptable excess SNR above threshold for both forward link and reverse link directions.

15. The article of manufacture of claim 10,
wherein said reverse link mode generates multiple second unit ping requests to the first unit, whereupon said first unit transmits corresponding multiple ping requests over an airlink to the second unit, and
wherein the second unit transmits multiple ping replies indicative of reverse link signal strength information in reply to the first unit, the signal strength information being displayed on LEDs of the first unit to align the first unit in the reverse link direction.

16. The article of manufacture of claim 10, wherein said first unit is a wireless modem and said second unit is an access point.

17. The article of manufacture of claim 16, wherein said reverse link traffic are uplink signals transmitted from the wireless modem to the access point, and said forward link traffic are downlink signals transmitted from the access point to the wireless modem.

18. A first unit for installment in a wireless communications environment, comprising:
a display device for displaying at least reverse link information of the first unit and forward link information that is transmitted from a second unit; and
a receiver for receiving said transmitted reverse link and forward link information;
said first unit being aligned in a forward link direction based upon at least one displayed signal quality parameter of the received forward link information, and being aligned in a reverse link direction based upon at least one displayed signal quality parameter of the reverse link information.

19. The first unit of claim 18, wherein each of said forward link and reverse link signal quality parameters are-verified to ensure that they exceed a threshold value.

20. The first unit of claim 18, wherein said second unit includes a receiver, and wherein the first unit generates reverse link traffic of control packets to the second unit receiver.

21. The first unit of claim 20, wherein the second unit receiver adjusts gain control based on an incoming control packet, and transmits AGC information to the first unit, said AGC information representing said reverse link information.

22. The first unit of claim 21, wherein said receiver extracts the second unit's received excess signal strength indication (RSSI) above a threshold value from the AGC information, and displays it on the display device, said RSSI representing said at least one displayed signal quality parameter of the reverse link information, the first unit being positioned so as to achieve an acceptable RSSI above the threshold value in the reverse link direction.

23. The first unit of claim 18, wherein the displayed at least one signal quality parameter of the reverse link signal is contained in a second unit reply signal responsive to reverse link data requests generated by the first unit.

24. The first unit of claim 18,
wherein said displayed signal quality parameters are displayed forward link and reverse link signal strength information, and
wherein said step of displaying further includes displaying said forward link and reverse link signal strength information each as a received excess signal strength indication (RSSI) above a threshold value, the first unit being positioned so as to achieve an acceptable RSSI above the threshold value for both forward link and reverse link directions.

25. The first unit of claim 18, wherein said receiver detects incoming packets of forward link information from the second unit, said incoming packets representing said forward link information.

26. The first unit of claim 25, wherein the receiver extracts said at least one signal quality parameter from the incoming packets.

27. The first unit of claim 26, wherein the extracted signal quality parameter is a received excess signal strength indication (RSSI) above a threshold value that is displayed at the display device, the first unit being positioned so as to achieve an acceptable RSSI above the threshold value in the forward link direction.

28. The first unit of claim 18, the display device including a plurality of LEDs, one of which illuminates only when the first unit is in a reverse link alignment mode.

29. The first unit of claim 18, wherein said second unit is an access point, said first unit being a wireless modem.

30. The first unit of claim 29, wherein said reverse link information are uplink signals transmitted from the wireless modem to the access point, and wherein said forward link information are downlink signals transmitted from the access point to the wireless modem.

31. A method of aligning a wireless modem, comprising:
receiving a forward link signal containing forward link signal strength information of a base station;
transmitting a reverse link signal to the base station, said base station
transmitting a reply containing reverse link signal strength information of the wireless modem;
displaying the forward link and reverse link signal strength information at the wireless modem; and
aligning the wireless modem in forward and reverse link directions based on the displayed information.

32. The method of claim 31, wherein said step of displaying further includes displaying said forward link and reverse link signal strength information each as a received excess signal strength indication (RSSI) above a threshold value, the wireless modem being positioned so as to achieve an acceptable RSSI above the threshold value for both forward link and reverse link directions.

* * * * *